(12) United States Patent
Cameron

(10) Patent No.: US 6,752,369 B1
(45) Date of Patent: Jun. 22, 2004

(54) CAMERA STEADYING DEVICE

(76) Inventor: Kim Cameron, 1635 W. Covina Blvd. #110, San Dimas, CA (US) 91773

( * ) Notice: Subject to any disclaimer, the term of this patent is extended or adjusted under 35 U.S.C. 154(b) by 0 days.

(21) Appl. No.: 10/198,909

(22) Filed: Jul. 19, 2002

(51) Int. Cl.[7] .............................................. A47B 97/00
(52) U.S. Cl. .................... 248/500; 248/158; 248/181.1; 396/419; 396/421; 396/423; 396/425
(58) Field of Search ................................ 248/500, 158, 248/181.1, 170; 396/419, 420, 421, 423, 424, 425

(56) References Cited

U.S. PATENT DOCUMENTS

| 548,306 | A | | 10/1895 | Eller | |
|---|---|---|---|---|---|
| 681,345 | A | | 8/1901 | Saunders | |
| 1,766,090 | A | * | 6/1930 | Worsching | 396/421 |
| 3,317,169 | A | | 5/1967 | Hendricks | |
| 3,575,369 | A | * | 4/1971 | Tetlow | 248/158 |
| 3,964,441 | A | * | 6/1976 | Wall | 119/796 |
| 5,021,813 | A | * | 6/1991 | Corrales | 396/24 |
| 5,098,182 | A | * | 3/1992 | Brown | 352/243 |
| 5,738,328 | A | * | 4/1998 | O'Farrill | 248/500 |
| 5,819,461 | A | * | 10/1998 | Killian | 42/94 |
| 6,064,109 | A | * | 5/2000 | Blanchard et al. | 257/577 |
| 6,196,504 | B1 | * | 3/2001 | Lemke | 248/187.1 |
| 6,487,780 | B1 | * | 12/2002 | Peterson et al. | 30/347 |

* cited by examiner

*Primary Examiner*—Leslie A. Braun
*Assistant Examiner*—Amy J. Sterling

(57) ABSTRACT

A camera steadying device for steadying a camera while taking a picture. The camera steadying device includes a body member being designed for being coupled to the camera being held by a user. A flexible extension member extends from the body member. The flexible extension member is designed for being stepped on by the user opposite the camera whereby the flexible extension member resists upward vertical movement of the camera for steadying the camera when the user is taking a picture.

11 Claims, 3 Drawing Sheets

CAMERA STEADYING DEVICE

BACKGROUND OF THE INVENTION

1. Field of the Invention

The present invention relates to camera supports and more particularly pertains to a new camera steadying device for steadying a camera while taking a picture.

2. Description of the Prior Art

The use of camera supports is known in the prior art. U.S. Pat. No. 681,345 describes a device for suspending a camera between a floor and a ceiling. Another type of camera support is U.S. Pat. No. 5,458,306 having a flat base that is pivotally coupled to a lower end of a monopod for being engaged by the foot to stabilize the monopod without using hands. U.S. Pat. No. 3,317,169 has a tape member that is extendable to preset intervals from a housing steadying a camera.

SUMMARY OF THE INVENTION

An object of the present invention is to provide a new camera steadying device that allows a camera to being steadied quickly to allow for a clear picture to taken.

Even still another object of the present invention is to provide a new camera steadying device that is compact and can be easily transported with the camera.

To this end, the present invention generally comprises a body member being designed for being coupled to the camera being held by a user. A flexible extension member extends from the body member. The flexible extension member is designed for being stepped on by the user opposite the camera whereby the flexible extension member resists upward vertical movement of the camera for steadying the camera when the user is taking a picture.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
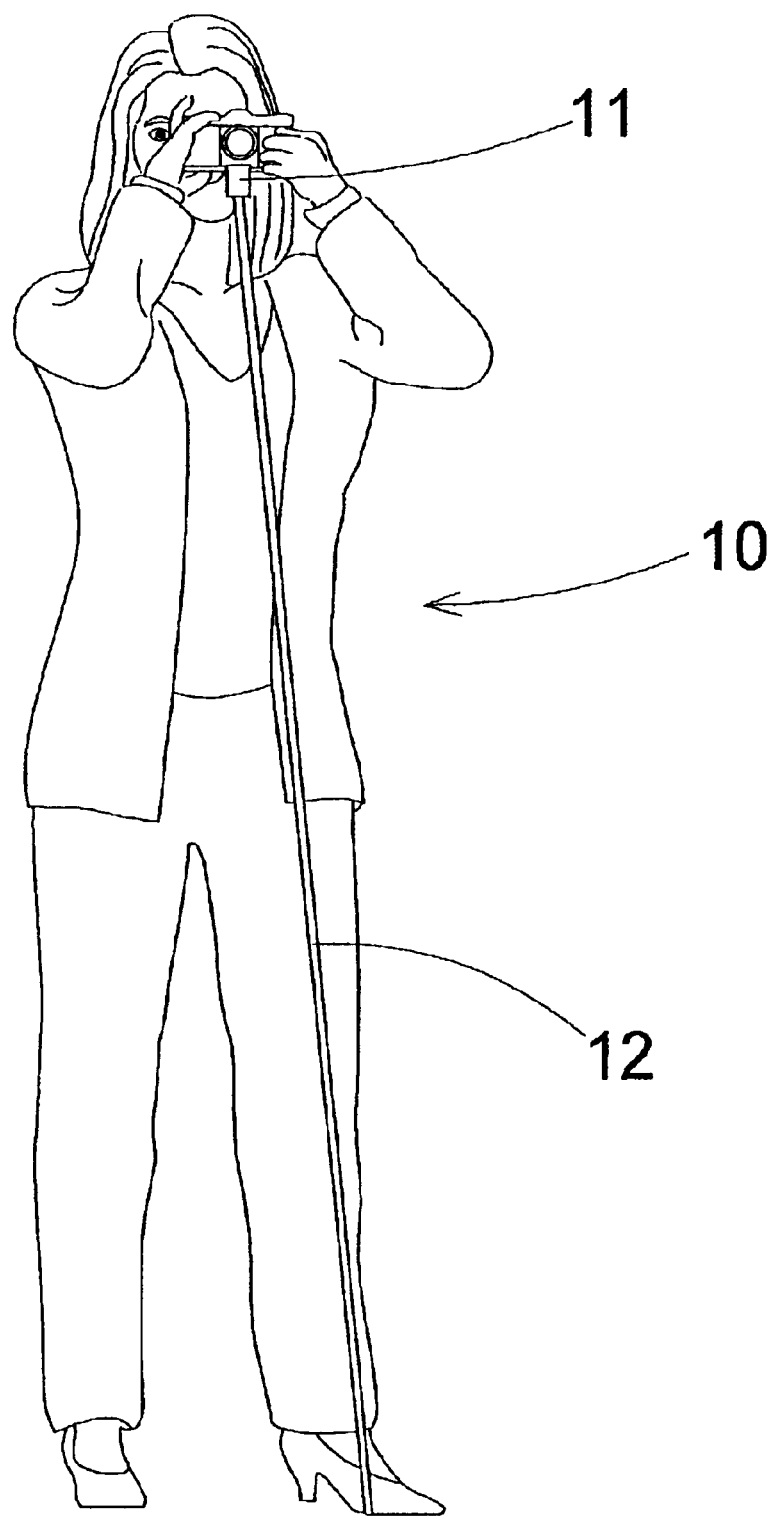
FIG. 1 is a front view of a new camera steadying device according to the present invention shown in use.
Figure 2:
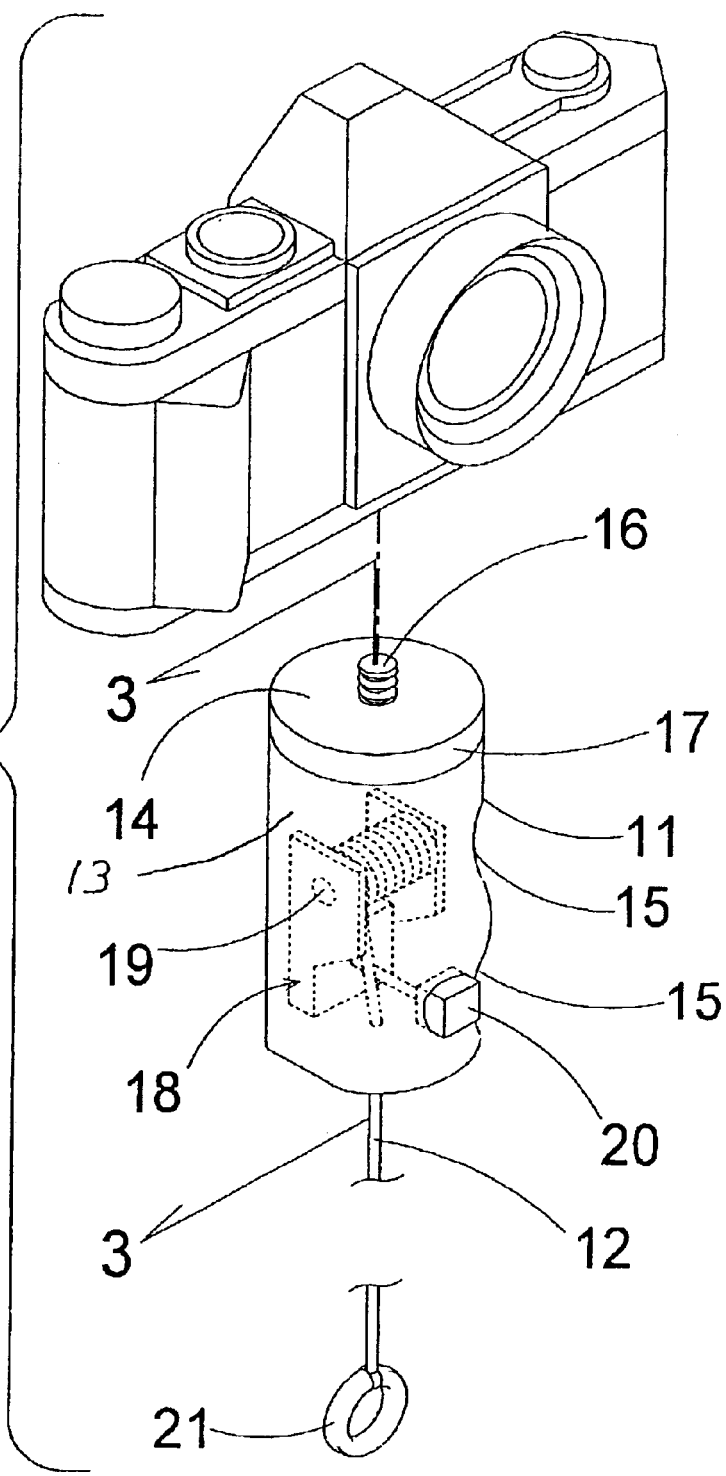
FIG. 2 is a perspective view of the present invention shown in use.
Figure 3:
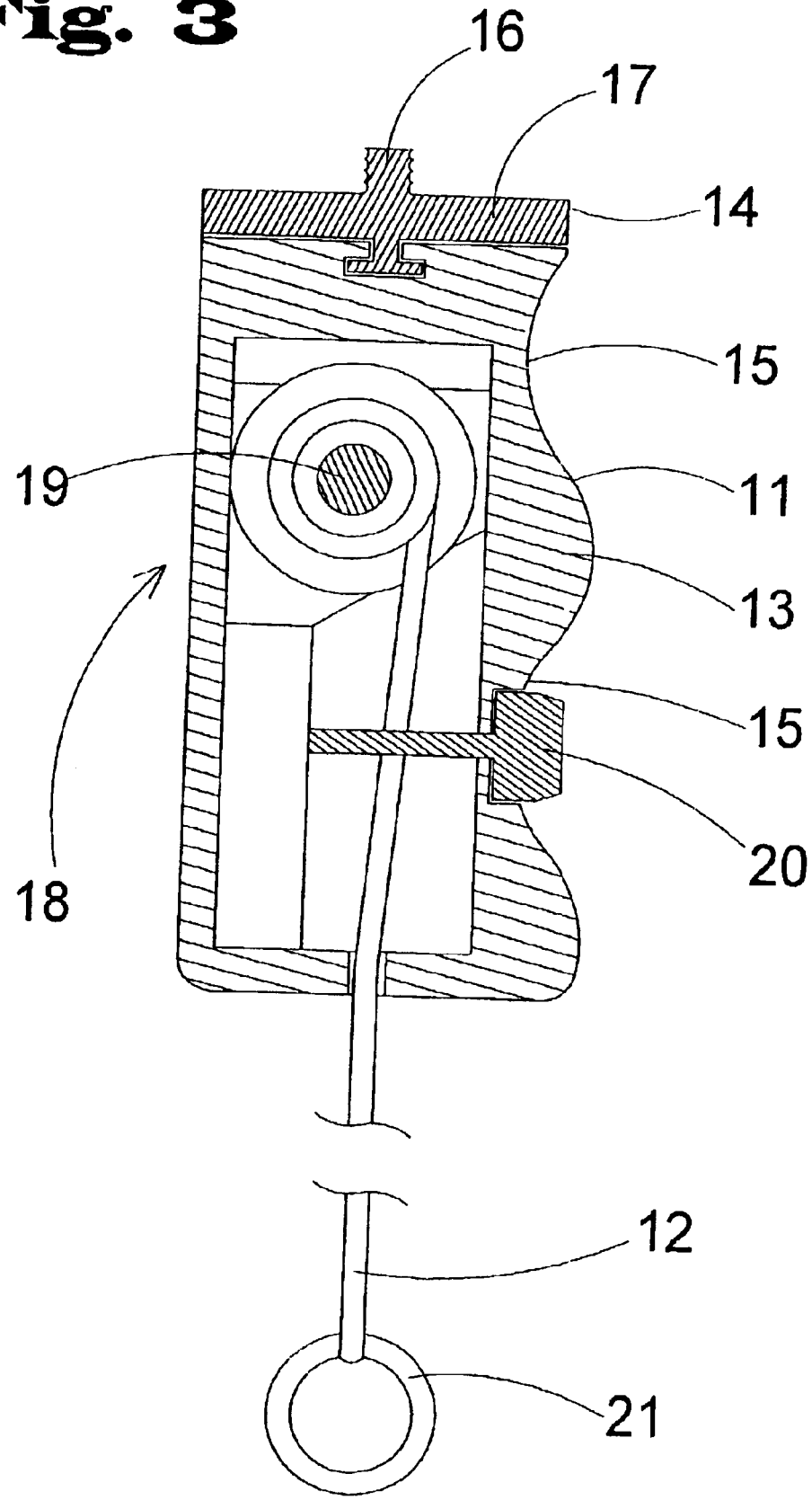
FIG. 3 is a cross-sectional view of the body member of the present invention taken along line 3—3 of FIG. 2.

With reference now to the drawings, and in particular to FIGS. 1 through 3 thereof, a new camera steadying device embodying the principles and concepts of the present invention and generally designated by the reference numeral 10 will be described.

As best illustrated in FIGS. 1 through 3, the camera steadying device 10 generally comprises a body member 11 being designed for being coupled to the camera being held by a user.

A flexible extension member 12 extends from the body member 11. The flexible extension member 12 is designed for being stepped on by the user opposite the camera whereby the flexible extension member 12 resists upward vertical movement of the camera for steadying the camera when the user is taking a picture. The flexible extension member 12 has length of about 6½ feet. The flexible extension member 12 comprises a flexible non-elastic material to prevent stretching when being used. A chain may also be used for the flexible extension member 12 being that links of the chain provide flexibility without elasticity.

The body member 11 comprises a main portion 13 and a fastener portion 14. The fastener portion 14 is coupled to the main portion 13. The main portion 13 is designed for being held in a hand of the user. The fastener portion 14 is designed for engaging the camera whereby the fastener portion 14 secures the camera to the main portion 13.

The main portion 13 of the body member 11 comprises a plurality of depressions 15. Each of the depressions 15 is designed for receiving at least one of the fingers of the hand for inhibiting the body member 11 slipping from the hand of the user when the main portion 13 of the body member 11 is held in the hand of the user.

The fastener portion 14 of the body member 11 comprises a mounting member 16 and an actuation member 17. The actuation member 17 is rotatably coupled to the main portion 13 of the body member 11. The mounting member 16 is coupled to the actuation member 17 opposite the main portion 13 of the body member 11s. The mounting member 16 is designed for threadably engaging the camera whereby the actuation member 17 is rotated with respect to the main portion 13 for facilitating engaging the mounting member 16 to the camera when the main portion 13 is being held in the hand of the user.

A winding assembly 18 is positioned in the body member 11. The winding assembly 18 is operationally coupled to the flexible extension member 12 whereby the winding assembly 18 draws the flexible extension member 12 into the body member 11 when the flexible extension member 12 is not being stepped on by the user.

A spool member 19 is positioned in the body member 11. The spool member 19 is operationally coupled between the winding assembly 18 and the flexible extension member 12 whereby the flexible extension member 12 is wound onto the spool member 19 when the flexible extension member 12 is drawn into the body member 11 by the winding assembly 18. The spool member 19 is for actuating the winding assembly 18 for biasing the winding assembly 18 against the spool member 19 when the flexible extension member 12 is unwound from the spool member 19.

A button member 20 is slidably coupled to the body member 11. The button member 20 is operationally coupled to the winding assembly 18 whereby the button member 20 is for maintaining the winding assembly 18 biased against the spool member 19 for permitting the flexible extension member 12 to remain extended from the body member 11 when the flexible body member 11 is released by the user. The button member 20 is designed for being depressed by the user whereby the button member 20 actuates the winding assembly 18 to bias the spool member 19 to wind the flexible extension member 12 onto the spool member 19.

A stop member 21 is coupled to the flexible extension member 12 opposite the body member 11. The stop member 21 abuts against the body member 11 when the flexible extension member 12 is drawn into the body member 11 by the winding assembly 18. The stop member 21 is designed for being gripped by the user to facilitate extension of the flexible extension member 12 from the body member 11 when the flexible extension member 12 has been drawn into the body member 11.

In use, the user inserts the mounting member 16 into the mount receptacle of the camera and rotates the actuation member 17 to thread the mounting member 16 into the mount receptacle to secure the body member 11 to the camera. The then grips the stop member 21 and pulls the flexible extension member 12 from the body member 11. The user places a foot on the flexible extension member 12 proximate the stop member 21 and presses the flexible extension member 12 against the ground. The user then draws the camera up to the eye and pulls the flexible extension member 12 between the foot of the user and the body member 11 taught and maintains tension on the flexible extension member 12 to steady the camera while taking the picture to minimize blur due to movement of the camera. When the user has finished taking the picture the user depresses the button member 20 and winding assembly 18 biases the spool member 19 to wind the flexible extension member 12 onto the spool member 19 and draw it into the body member 11.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A camera steadying device for steadying a camera while taking a picture, the camera steadying device comprising:

a body member being adapted for being coupled to the camera being held by a user;

a flexible extension member extending from said body member, said flexible extension member being adapted for being stepped on by the user opposite the camera such that said flexible extension member resists upward vertical movement of the camera for steadying the camera when the user is taking a picture;

a winding assembly being positioned in said body member, said winding assembly being operationally coupled to said flexible extension member such that said winding assembly draws said flexible extension member into said body member when said flexible extension member is not being stepped on by the users;

a spool member being positioned in said body member, said spool member being operationally coupled between said winding assembly and said flexible extension member such that said flexible extension member is wound onto said spool member when said flexible extension member is drawn into said body member by said winding assembly, said spool member being for actuating said winding assembly for biasing said winding assembly against said spool member when said flexible extension member is unwound from said spool member; and a button member being slidably coupled to said body member, said button member being operationally coupled to said winding assembly such that said button member is for maintaining said winding assembly biased against said spool member for permitting said flexible extension member to remain extended from said body member when said flexible body member is released by the user, said button member being adapted for being depressed by the user such that said button member actuates said winding assembly to bias said spool member to wind said flexible extension member onto said spool member.

2. The camera steadying device as set forth in claim 1, further comprising:

said body member comprising a main portion and a fastener portion, said fastener portion being coupled to said main portion, said main portion being adapted for being held in a hand of the user, said fastener portion being adapted for engaging the camera such that said fastener portion secures the camera to said main portion.

3. The camera steadying device as set forth in claim 2, further comprising:

said main portion of said body member comprising a plurality of depressions, each of said depressions being adapted for receiving at least one of the fingers of the hand for inhibiting said body member slipping from the hand of the user when said main portion of said body member is held in the hand of the user.

4. The camera steadying device as set forth in claim 2, further comprising:

said fastener portion of said body member comprising a mounting member and an actuation member, said actuation member being rotatably coupled to said main portion of said body member, said mounting member being coupled to said actuation member opposite said main portion of said body member, said mounting member being adapted for threadably engaging the camera such that said actuation member is rotated with respect to said main portion for facilitating engaging said mounting member to the camera when said main portion is being held in the hand of the user.

5. The camera steadying device as set forth in claim 1, further comprising;

a stop member being coupled to said flexible extension member opposite said body member, said stop member abutting against said body member when said flexible extension member is drawn into said body member by said winding assembly, said stop member being adapted for being gripped by the user to facilitate extension of said flexible extension member from said body member when said flexible extension member has been drawn into said body member.

6. A camera steadying device for steadying a camera while taking a picture, the camera steadying device comprising:

a body member being adapted for being coupled to the camera being held by a user;

a flexible extension member extending from said body member, said flexible extension member being adapted for being stepped on by the user opposite the camera such that said flexible extension member resists upward vertical movement of the camera for steadying the camera when the user is taking a picture;

said body member comprising a main portion and a fastener portion, said fastener portion being coupled to said main portion, said main portion being adapted for being held in a hand of the user, said fastener portion being adapted for engaging the camera such that said fastener portion secures the camera to said main portion;

said main portion of said body member comprising a plurality of depressions, each of said depressions being adapted for receiving at least one of the fingers of the hand for inhibiting said body member slipping from the hand of the user when said main portion of said body member is held in the hand of the user;

said fastener portion of said body member comprising a mounting member and an actuation member, said actuation member being rotatably coupled to said main portion of said body member, said mounting member being coupled to said actuation member opposite said main portion of said body members, said mounting member being adapted for threadably engaging the camera such that said actuation member is rotated with respect to said main portion for facilitating engaging said mounting member to the camera when said main portion is being hold in the hand of the user;

a winding assembly being positioned in said body member, said winding assembly being operationally coupled to said flexible extension member such that said winding assembly draws said flexible extension member into said body member when said flexible extension member is not being stepped on by the user;

a spool member being positioned in said body member, said spool member being operationally coupled between said winding assembly and said flexible extension member such that said flexible extension member is wound onto said spool member when said flexible extension member is drawn into said body member by said winding assembly, said spool member being for actuating said winding assembly for biasing said winding assembly against said spool member when said flexible extension member is unwound from said spool member;

a button member being slidably coupled to said body member, said button member being operationally coupled to said winding assembly such that said button member is for maintaining said winding assembly biased against said spool member for permitting said flexible extension member to remain extended from said body member when said flexible body member is released by the user, said button member being adapted for being depressed by the user such that said button member actuates said winding assembly to bias said spool member to wind said flexible extension member onto said spool member; and a stop member being coupled to said flexible extension member opposite said body member, said stop member abutting against said body member when said flexible extension member is drawn into said body member by said winding assembly, said stop member being adapted for being gripped by the user to facilitate extension of said flexible extension member from said body member when said flexible extension member has been drawn into said body member.

7. A camera steadying device for steadying a camera while taking a picture, the camera steadying device comprising:

a body member being adapted for being coupled to the camera being held by a user;

a flexible extension member extending from said body member, said flexible extension member being adapted for being stepped on by the user opposite the camera such that said flexible extension member resists upward vertical movement of the camera for steadying the camera when the user is taking a picture;

a winding assembly being positioned in said body member, said winding assembly being operationally coupled to said flexible extension member such that said winding assembly draws said flexible extension member into said body member when said flexible extension member is not being stepped on by the user;

a spool member being positioned in said body member, said spool member being operationally coupled between said winding assembly and said flexible extension member such that said flexible extension member is wound onto said spool member when said flexible extension member is drawn into said body member by said winding assembly, said spool member being for actuating said winding assembly for biasing said winding assembly against said spool member when said flexible extension member is unwound from said spool member; and a button member being slidably coupled to said body member, said button member being operationally coupled to said winding assembly such that said button member is for maintaining said winding assembly biased against said spool member for permitting said flexible extension member to remain extended from said body member when said flexible body member is released by the user, said button member being adapted for being depressed by the user such that said button member actuates said winding assembly to bias said spool member to wind said flexible extension member onto said spool member.

8. The camera steadying device as set forth in claim 7, further comprising:

said body member comprising a main portion and a fastener portion, said fastener portion being coupled to said main portion, said main portion being adapted for being held in a hand of the user, said fastener portion being adapted for engaging the camera such that said fastener portion secures the camera to said main portion.

9. The camera steadying device as set forth in claim 8, further comprising:

said main portion of said body member comprising a plurality of depressions, each of said depressions being adapted for receiving at least one of the fingers of the hand for inhibiting said body member slipping from the hand of the user when said main portion of said body member is held in the hand of the user.

10. The camera steadying device as set forth in claim 8, further comprising:

said fastener portion of said body member comprising a mounting member and an actuation member, said actuation member being rotatably coupled to said main portion of said body member, said mounting member being coupled to said actuation member opposite said main portion of said body member, said mounting member being adapted for threadably engaging the camera such that said actuation member is rotated with respect to said main portion for facilitating engaging said mounting member to the camera when said main portion is being held in the hand of the user.

11. The camera steadying device as set forth in claim 7, further comprising:

a stop member being coupled to said flexible extension member opposite said body member, said stop member abutting against said body member when said flexible extension member is drawn into said body member by said winding assembly, said stop member being adapted for being gripped by the user to facilitate extension of said flexible extension member from said body member when said flexible extension member has been drawn into said body member.

* * * * *